United States Patent [19]

Dangel

[11] Patent Number: 4,671,135
[45] Date of Patent: Jun. 9, 1987

[54] TRANSMISSION SYSTEM FOR A FOUR-WHEEL DRIVE VEHICLE

[75] Inventor: Henry Dangel, Mulhouse, France

[73] Assignee: Automobiles Dangel, Sentheim, France

[21] Appl. No.: 711,011

[22] Filed: Mar. 12, 1985

[30] Foreign Application Priority Data

Mar. 16, 1984 [FR] France ................. 84 04133

[51] Int. Cl.⁴ .......................................... F16H 37/08
[52] U.S. Cl. ......................... 74/694; 74/701; 74/710.5; 74/713; 74/714; 180/248
[58] Field of Search ............... 74/674, 694, 700, 701, 74/710, 713, 714, 740, 665 T; 180/233, 248, 249, 250; 192/85 CA

[56] References Cited

U.S. PATENT DOCUMENTS

| 3,065,832 | 11/1962 | Becknell | 192/85 CA |
|---|---|---|---|
| 4,417,642 | 11/1983 | Sazuki et al. | 180/249 |
| 4,428,452 | 1/1984 | Muraoka et al. | 180/249 |
| 4,441,575 | 4/1984 | Suzuki | 74/694 X |
| 4,449,604 | 5/1984 | Suzuki | 180/248 X |
| 4,457,394 | 7/1984 | Suzuki | 180/248 X |
| 4,476,953 | 10/1984 | Hiraiwa | 180/249 |
| 4,516,443 | 5/1985 | Hamano et al. | 74/711 |
| 4,541,503 | 9/1985 | Akutagawa et al. | 180/249 |

FOREIGN PATENT DOCUMENTS

| 0094870 | 11/1983 | European Pat. Off. | |
|---|---|---|---|
| 2480204 | 10/1981 | France . | |
| 2526729 | 12/1984 | France . | |
| 58-63523 | 4/1983 | Japan | 180/248 |
| 58-63524 | 4/1983 | Japan | 180/248 |
| 58-63525 | 4/1983 | Japan . | |
| 58-139822 | 8/1983 | Japan | 180/233 |
| 2074517 | 11/1981 | United Kingdom . | |
| 2074516 | 11/1981 | United Kingdom . | |

Primary Examiner—Rodney H. Bonck
Assistant Examiner—Dwight G. Diehl
Attorney, Agent, or Firm—Wenderoth, Lind & Ponack

[57] ABSTRACT

This system can be used, in particular, with a vehicle having a transverse drive motor unit and converts a front wheel drive vehicle into a four-wheel drive vehicle. The system includes a central differential driven from an output member of a gear box by means of a hollow body in which the differential associated with the front wheels is housed. The two outputs of the central differential drive the two differentials associated with the front and rear wheels. The arrangement of the differentials is particularly compact and the original housing of the differential can be retained.

14 Claims, 2 Drawing Figures

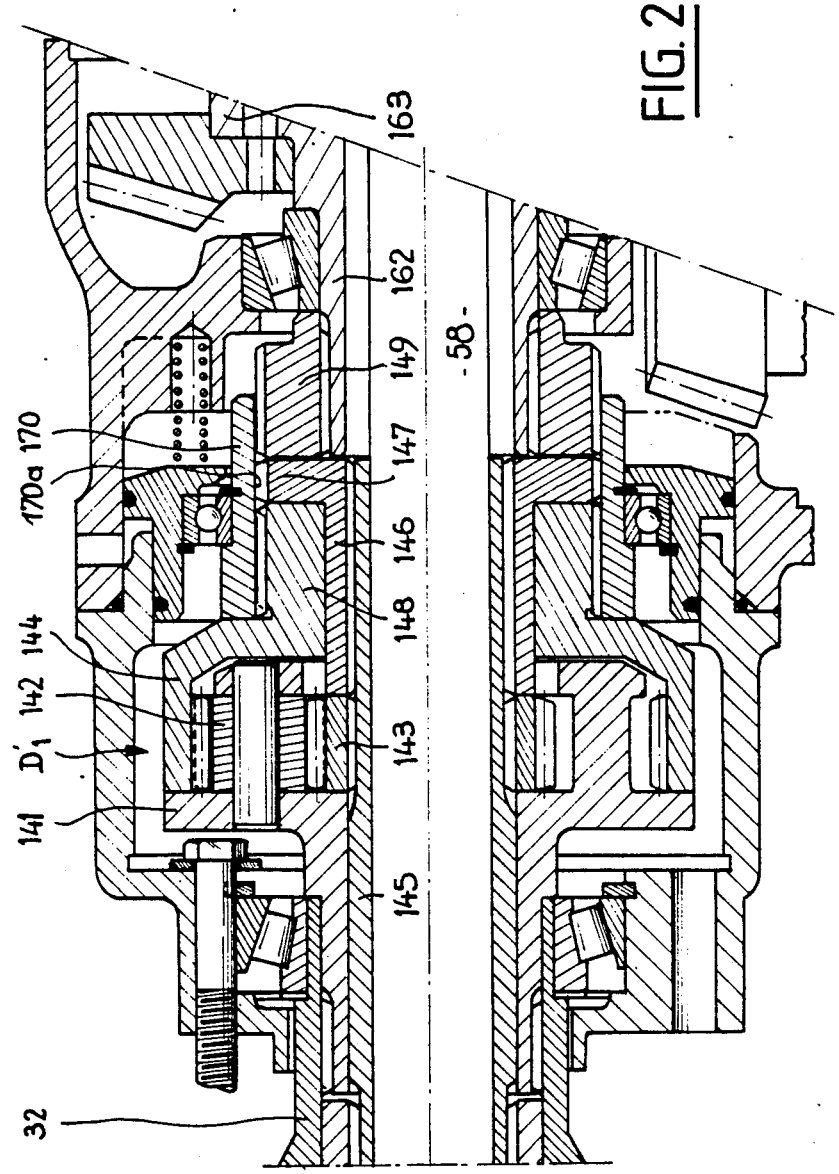

TRANSMISSION SYSTEM FOR A FOUR-WHEEL DRIVE VEHICLE

BACKGROUND OF THE INVENTION

This invention relates to a transmission system having three differentials for use in a four-wheel drive vehicle, and particularly for use in a vehicle having a transverse power-drive unit, that is, a unit arranged perpendicular to the longitudinal direction of the vehicle.

French patent application FR-82 08 440 filed May 14, 1982 discloses a tranmission system comprising a first differential, the input member of which being driven from the output shaft of a gear box, and of which the two output members are connected to one of the front wheels and to the input member of a second differential, the two output members of which being connected to the second front wheel and to a transmission shaft which is itself connected to a differential associated with the rear wheels.

Such an arrangement entails a drawback in that the two front wheels are not driven from the same differential and this can cause a drive dissymetry.

There are also known arrangements in which a central differential has its two output members connected to two other differentials, the central differential and the differential associated with the front wheels being arranged coaxially approximately between the two front wheels, so that one of the transmission shafts of the front wheels extends through the central differential.

Such known arrangements (GB-A-2074 517-JP-A-58/63523) are bulky and adaptation of these arrangements to standard or production line vehicles is difficult.

GENERAL DESCRIPTION OF THE INVENTION

It is an object of the invention to provide a transmission system for a four-wheel drive vehicle of the type having three differentials in which the wheels of each set of wheels are driven from the same differential, this system being however compact and requiring very little modification for standard or production line vehicles. It is another object of this system to allow the easy modification of a production line vehicle with a transverse motor drive unit and front-wheel drive into a four-wheel drive vehicle.

According to the invention, there is provided a transmission system for a vehicle with a transverse power-drive unit and four-wheel drive, comprising three differentials: a central differential, a differential associated with the front wheels and a differential associated with the rear wheels; the central differential having an input member driven by the output shaft of the power-drive unit and two output members arranged to drive the input member of the differential associated with the front wheels and a member connected to the input of the differential associated with the rear wheels, the central differential and the front wheel differential being arranged coaxially approximately between the two front wheels with one of the transmission shafts driving the front wheels extend through the central differential, characterized in that the output member of the powerdrive unit drives a hollow body inside of which is located the front wheel differential, this hollow body being connected to an input member of the central differential.

According to other features of the invention:

There is provided in a zone between the central differential and the front-wheel differential, arranged concentrically from the outside to the inside, the following: a lateral portion of the hollow body; a portion of the casings of the two differentials; a hollow shaft member connecting an output of the central differential to the input of the front wheel differential; and a transmission shaft connecting to one of the front wheels, an output of the front wheel differential;

There is also provided a locking mechanism for the central differential, comprising a sliding spline sleeve arranged to fix in rotation two of the input and/or output members of the central differential.

BRIEF DESCRIPTION OF THE DRAWINGS

The invention will be described in more detail below with reference to the preferred embodiments and to the accompanying drawings, which are given by way of non-limiting examples.

In the drawings

FIG. 2 is a section partial view of a modified embodiment.

DESCRIPTION OF PREFERRED EMBODIMENTS

Figure 1:
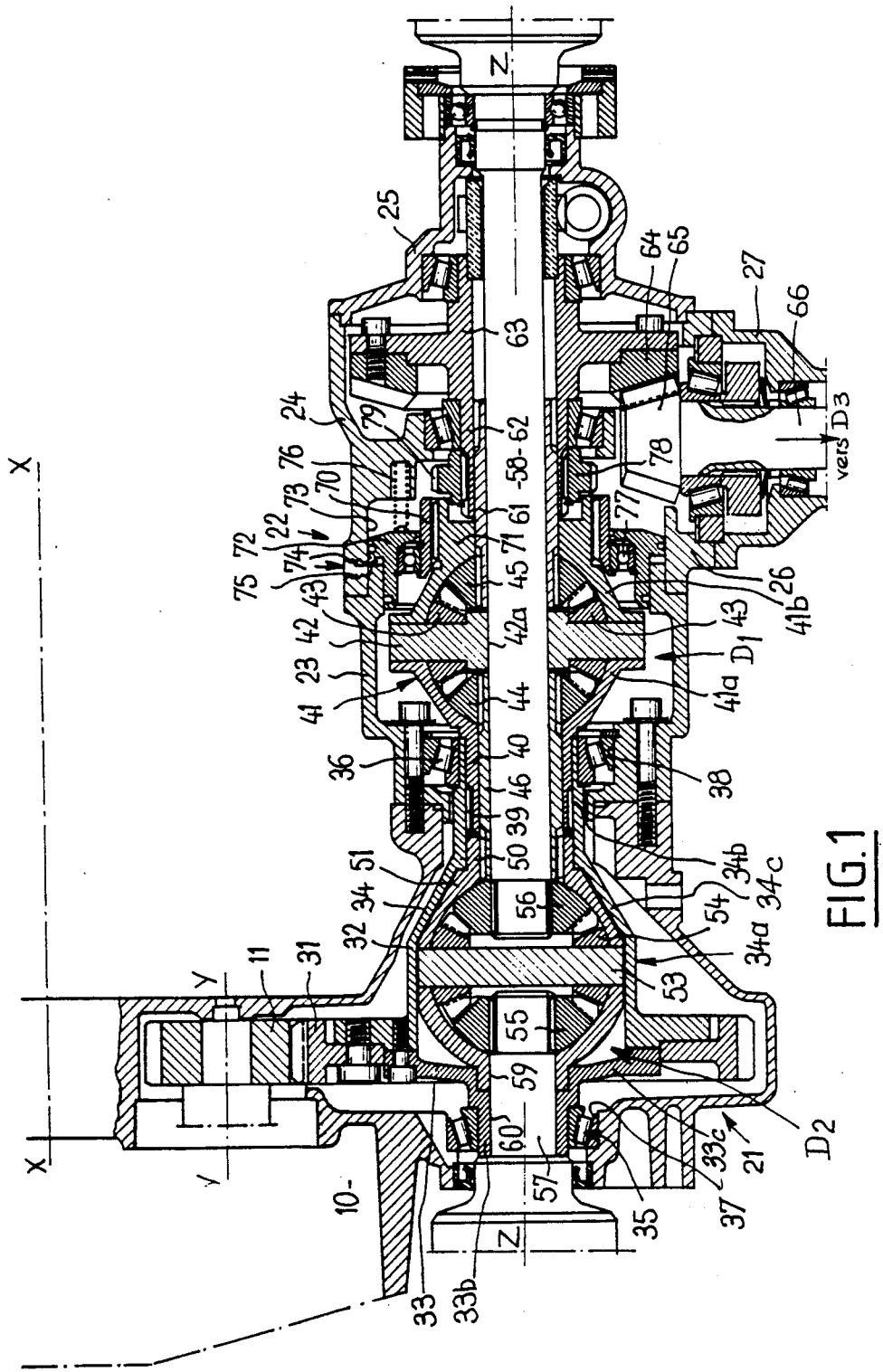
FIG. 1 is a section view of an embodiment of the device according to the invention, the rear wheel differential not being shown in this Figure.

FIG. 1 shows an axis X—X which is the axis of the crankshaft of an internal combustion engine (not shown) positioned transversely, that is, perpendicular to the longitudinal direction of the vehicle. This axis X—X is also the axis of the primary shaft of a gear box of which only a part of the casing is shown.

Axis Y—Y is the axis of the driven shaft of this gear box of which pinion 11 constitutes the output member.

The system according to the invention is contained in part in housing 20 of which portion 21 is continuous with the gearbox housing, and is contained in part in housing 22 having two principal components 23 and 24, having end elements 25, 26 and 27.

The output pinion 11 of the box engages a ring gear 31 having axis Z—Z, parallel with axes X—X and Y—Y, fixed to a hollow body 32, having two components 33, 34, which is rotatably mounted at its two ends by two conical bearings 35 and 36, respectively supported by journal 37 of housing 20 and journal 38 of housing 23. This hollow body includes a cylindrical portion 34a and two portions 33b, 34b of smaller diameter and having the inner races of bearings 35, 36 which are joined to the cylindrical portion by an almost radially extending flange 33c seen in the left hand portion of the Figure and by a connecting zone 34c of frustoconic shape seen, in the right hand portion seen at the right hand portion of the Figure, this hollow body is connected by internal splines 39 to tubular extension 40 of casing 41 of a first differential $D_1$ called the "central differential". This casing 41 has two parts 41a, 41b for ease of assembly, and includes spider 42 on which are mounted, as idlers, planet wheels 43 meshing with two sun gears 44 and 45. The first sun gear 44 is fixed in rotation with hollow shaft section 46 extending into hollow extension 40 of casing 41, and of which the other end is fixed in rotation by splines to lateral extension 50 of casing 51 of a second differential $D_2$ which is called the "front differential" and which is housed within hollow body 32. The two differentials $D_1$ and $D_2$ are centred on the same axis Z—Z.

The casing 51 includes the input member of this second differential which also comprises an axle or spider 53 on which are rotatably mounted planet wheels 54 which engage two sun pinions 55 and 56 which are themselves fixed in rotation with two shaft sections 57 and 58 connected to the front left and right wheels. The hollow shaft section 57 extends into bores 59, 60 of casing 51 and hollow body 32, while the second shaft section 58 extends through hollow shaft section 46, bore 42a of spider 32 of central differential $D_1$, and through hollow shaft 61 which forms part of a transmission device connected to the second sun gear 45 of the central differential D and comprising a tubular extension 62 of flange 63 which is fixed to a bevel gear 64. This gear 64 engages a bevel gear pinion 65 connected to shaft section 66 to provide the coupling with the third differential (not shown) which ensures the drive of the rear wheels of the vehicle.

The system includes a mechanism for locking the central differential $D_1$, so as to be able to drive the two differentials, front and rear, under identical conditions. This mechanism includes sleeve 70 with internal splines slideable on external splines provided on lateral extension 71 of casing 41b of the central differential. This sliding sleeve can be drawn in translation by an annular piston 72 mounted with a fluid-tight sliding seal in cylindrical housing 73 of housing 24 and defining with the cylindrical wall a chamber 74 which is connected through pipe 75 to the lubricating oil system of the engine. At least one spring 76 ensures the return of piston 72 and of sleeve 70 into the unlocked position of the central differential. A bearing 77 is inserted between sleeve 71 and the piston 72.

This locking mechanism also includes a gear wheel 78 keyed to the end of tubular extension 62 and including, at its periphery, external teeth 79 which sleeve 70 engages.

The system also includes a number of conventional elements, such as bearings, sealing members, fastening members, etc, which will not be described here in detail. The homocinetic joints which drive the wheels also have not been shown.

The operation of the system is as follows: in normal operation output member 11 of the gear box drives ring, gear 31 and hollow body 32 which, itself rotates input member 41 of the central differential $D_1$. The two sun gears 44 and 45 of this central differential are coupled respectively to the input members of the differentials of the front and rear wheels.

In particular, front differential $D_2$ is driven by casing 51 and it drives the two front wheels through two shaft sections 57 and 58; in the prior art analysed above, these wheels were driven by two different differentials.

It is to be noted that to obtain this result, it is necessary that the transmission shaft 58 of the right front wheel pass through the central differential, and that this central differential be driven from the gear box through hollow body 32 within which is located front differential $D_2$.

If slipping or loss of adherence occurs in regard to a wheel or an axle, it is possible to lock the central differential $D_1$ by means of the mechanism described above provided for this purpose. For this, it suffices to supply chamber 74 with oil from the engine by means of a suitable control (not shown in the drawing), the construction of which being known to those skilled in the art, for pushing piston 72, and consequently the splined sleeve to the right in the drawing. The sleeve then engages gear wheel 78, and fixes in rotation the entire central differential so that the two differentials associated with the front set of wheels and the rear set of wheels will be driven.

As a result of the above features, the transmission system is particularly compact, since the two differentials, the central differential $D_1$ and the front wheel differential $D_2$, as well as the elements associated with them, are completely integrated into the transverse drive motor unit.

In addition:
original parts are maintained at least as regards the motor drive unit and housing 21 of differential $D_1$ with only housing assembly 23, 24 being added; this also in the case, of course, in regard to transmission in direction of rear wheel differential $D_3$;

each of the two wheels of each set of wheels is driven from the same differential, which entails improved symmetry for power transmission;

bearing arrangement 35 and 36 provides good balance for hollow body 32 which participates in power transmission;

the system has simple means for locking the central differential;

the system is compact.

In the embodiment of FIG. 2, central differential $D'_1$ is of the epicyclic train type, and provides for unequal power distribution, for example, $\frac{1}{3}-\frac{2}{3}$, between the front train and the rear train.

This differential includes a planet gear holder 141, which constitutes the input member, coupled to hollow body 32, and in which planet gears 142 engage sun gear 143 and crown wheel 144. The sun gear 143 constitutes the output member keyed to hollow shaft section 145, which itself is fixed in rotation with the input member of differential $D_2$. The crown wheel 144 constitutes the second output member for driving third differential $D_3$.

The hollow shaft section 145 extends to the right in the drawing and carries sleeve 146, fixed in rotation with shaft 145, and carries collar 147 with external splines.

The crown wheel 144 is extended by an externally splined portion 148, which engages sleeve 170 of the locking device. In the extension of portion 148 there is provided sleeve 149, internally splined and in engagement through its internal splines with lateral extension 162 of flange 163, with the external splines engaging sleeve 170. The latter includes unsplined intermediate part 170a, which, in normal operation, is opposite collar 147.

The splines of parts 148, 149 and 147 are identical.

In normal operation, the power is transmitted from the central differential $D'_1$ to differentials $D_2$ and $D_3$, through the output members constituted by sun gear 143 and crown wheel 144.

To lock differential $D_1$, the sleeve 170 is moved to the right, which brings the sleeve 170 into engagement with collar 147 which locks sun gear 143 and crown wheel 144 in rotation.

In addition to the different power distribution, this embodiment offers the same advantages as the previously described embodiment.

Of course, the arrangement according to the invention may be used with a transverse motor drive unit located at the rear, the roles of the front and rear wheels then being transposed.

What is claimed is:

1. A four-wheel drive transmission system for a vehicle comprising two front wheels and two rear wheels and a transverse engine drive unit having an output member, said system comprising a central differential, a front-wheel differential coaxial with the central differential, and a rear-wheel differential for the rear wheels, the front-wheel differential having an input member and two output members, and the central differential having an input member, a first output member and a second output member, the first output member of the central differential being drivingly connected to the input member of the front-wheel differential, and a transmission device for drivingly connecting the second output member of the central differential to the rear-wheel differential, casing means enclosing the output member of the engine drive unit, the front-wheel differential, the central differential and a part of the transmission device, transmission shafts for respectively drivingly connecting the output members of the front-wheel differential to the front-wheels, and an axially extending hollow body coaxial with and surrounding the front wheel differential and rotatively mounted in said casing means, the hollow body having a first end portion adjacent to said output member of the engine drive unit and a second end portion opposed to said first end portion, means drivingly connecting the output member of the engine drive unit to the first end portion of the hollow body and means drivingly connecting the second end portion of the hollow body to the input member of the central differential, the front-wheel differential and said first end portion of the hollow body being located axially adjacent to said output member of the engine drive unit, the central differential and the transmission device being located adjacent to the second end portion of the hollow body and axially on a side of the front-wheel differential remote from said means drivingly connecting the output member of the engine drive unit to the first end portion of the hollow body, the transmission device including a hollow shaft connected to rotate with said second output member of the central differential, the respective transmission shaft connecting one of the output members of the front-wheel differential to one of the front-wheels extending through the central differential and through the hollow shaft of the transmission device, the transmission device further comprising a gear wheel coaxial with the hollow shaft and coaxial with the central differential and connected to rotate with the hollow shaft, a third transmission shaft for connection to the rear-wheel differential, and means for drivingly connecting said gear wheel to said third transmission shaft.

2. A system according to claim 1, wherein said casing means comprise a casing part surrounding said front-wheel differential and a casing part surrounding said central differential and detachably secured to the casing part surrounding the front-wheel differential, whereby it is possible to assemble and disassemble the central differential and the transmission device relative to the front-wheel differential which may remain associated with the output member of the engine drive unit, the system further comprising a first bearing interposed between the casing part surrounding the front-wheel differential and the hollow body adjacent to said first end portion of the hollow body, and a second bearing interposed between the casing part surrounding the central differential and the hollow body adjacent to the second end portion of the hollow body for rotatively supporting the follow body in the casing means.

3. A system according to claim 1, wherein there are arranged concentrically with the common axis of the central differential and the front-wheel differential in the following order in a direction toward said axis, first, said second end portion of the hollow body, then a cylindrical extension portion of the input member of the central differential and a cylindrical extension portion of the input member of the front-wheel differential, then a hollow shaft connected to rotate with the first output member of the central differential and finally one of said transmission shafts for drivingly connecting one of the front-wheel outout members of the front-wheel differential to the respective front wheel.

4. A system according to claim 1, wherein the input member of the central differential comprises a housing and planet gears rotatively mounted in the housing, and the output members of the central differential are sun gears rotatively mounted relative to the housing and in engagement with the planet gears.

5. A system according to claim 4, wherein the housing of the central differential comprises two housing parts located on opposite sides of a plane perpendicular to the axis of the central differential, there being mounted between the two housing parts a spider carrying said planet wheels, a bore being provided in the spider for the passage of one of the transmission shafts for connecting one of the output members of the front-wheel differential to the respective front-wheel.

6. A system according to claim 1, wherein the central differential is an epicyclic gear arrangement comprising a planet gear carrier constituting the input member, planet gears rotatively mounted on the planet gear carrier, a sun gear constituting the first output member of the central differential and a ring gear constituting the second output member of the central differential, said sun gear and ring gear being in engagement with the planet gears of the planet gear carrier.

7. A system according to claim 7, further comprising a locking mechanism for the central differential, said mechanism including splines on the ring gear, a member mounted on the hollow shaft of the transmission device so as to rotate with said hollow shaft, splines on said member mounted on said hollow shaft, and an axially movable sleeve having first splines and second splines axially spaced from the first splines so as to from a gap therebetween, and splines on the sun gear of the central differential, said sleeve drivingly interconnecting the splines on the ring gear and the splines on said member mounted on the hollow shaft of the transmission device and capable of selectively connecting and disconnecting the splines on the ring gear and the splines on the sun gear depending on the axial position of the sleeve, and means for axially moving said sleeve.

8. A system according to claim 1, further comprising a locking mechanism for the central differential, said mechanism including splines on the input member, splines carried by the second output member of the central differential, an axially movable sleeve having splines for selectively connecting and disconnecting the splines of the input member and the splines carried by the second output member, and means for shifting said sleeve.

9. A system according to claim 8, wherein the central differential comprises a housing constituting said input member of the central differential and said sleeve is slidably mounted on said housing, and said splines carried by said second output member are defined on a gear wheel mounted on said hollow shaft of the transmission device to rotate therewith.

10. A system according to claim 8, comprising spring return means for biasing the sleeve to the disconnecting position thereof and an annular piston of a jack mounted in said casing means and cooperative with the sleeve for constituting said shifting means in opposition to the action of the spring means.

11. A system according to claim 10, comprising a bearing interposed between the sleeve and the annular piston.

12. A system according to claim 1, further comprising a locking mechanism for the central differential, said mechanism including splines on the second output member of the central differential, splines on the first output member of the central differential and axially movable sleeve having splines for selectively connecting and disconnecting the splines of the second output member and the splines of the first output member of the central differential, and means for shifting said sleeve.

13. A system according to claim 12, comprising spring return means for biasing the sleeve to the disconnecting position thereof and an annular piston of a jack mounted in said casing means and cooperative with the sleeve for constituting said shifting means in opposition to the action of the spring means.

14. A system according to claim 13, comprising a bearing interposed between the sleeve and the annular piston.

* * * * *